United States Patent [19]
Baird et al.

[11] Patent Number: 5,363,733
[45] Date of Patent: Nov. 15, 1994

[54] QUICK RELEASE SAW BLADE CHUCK AND SAW INCLUDING THE SAME

[75] Inventors: Charles J. Baird; Barry D. Wixey; Louis C. Brickner, all of Pittsburgh, Pa.

[73] Assignee: Delta International Machinery Corp., Pittsburgh, Pa.

[21] Appl. No.: 978,107

[22] Filed: Nov. 18, 1992

[51] Int. Cl.$^5$ ............................................ B27B 19/02
[52] U.S. Cl. ................................. 83/786; 83/662; 83/699.21; 83/699.31; 403/DIG. 4
[58] Field of Search ............... 83/776, 782, 783, 698, 83/699, 662, 784, 786, 779, 699.21, 699.31, 699.41; 30/392, 394, 330, 331; 403/17, 321, 322, 323, 327, 330, DIG. 4, DIG. 8, DIG. 9; 279/35

[56] References Cited

U.S. PATENT DOCUMENTS

| | | | |
|---|---|---|---|
| D. 85,847 | 12/1931 | Tautz | D15/133 |
| D. 292,713 | 11/1987 | Miller | D15/133 |
| 1,659,801 | 2/1928 | Basmaison | 30/330 |
| 1,877,705 | 9/1932 | Tautz | 83/699 X |
| 1,956,912 | 5/1934 | Tautz | 83/439 |
| 1,964,651 | 6/1934 | Tautz | 83/98 X |
| 1,964,652 | 6/1934 | Tautz | 83/98 X |
| 1,969,827 | 8/1934 | Tautz | 279/44 |
| 1,984,500 | 12/1934 | Tautz | 30/392 X |
| 2,073,430 | 3/1937 | Tautz | 83/781 X |
| 2,099,321 | 11/1937 | Tautz | 83/752 |
| 2,240,755 | 5/1941 | Briggs | 83/698 X |
| 2,721,587 | 10/1955 | Dremel | 83/782 X |
| 3,542,097 | 11/1970 | Dudek | 30/392 |
| 4,106,181 | 8/1978 | Mattchen | 83/698 X |
| 4,294,013 | 10/1981 | Krieg | 30/392 |
| 4,575,936 | 3/1986 | Gringer | 30/330 X |
| 4,601,477 | 7/1986 | Barrett et al. | 30/394 X |
| 4,681,006 | 8/1987 | Miller | 83/782 |
| 4,825,741 | 5/1989 | Wellington et al. | 83/786 X |
| 5,088,369 | 2/1992 | Rice et al. | 83/783 |
| 5,103,565 | 4/1992 | Holzer, Jr. | 30/392 |

FOREIGN PATENT DOCUMENTS 1060580 12/1959 Germany .
967129 8/1964 United Kingdom .

OTHER PUBLICATIONS

"The New Constant-Tension Scroll Saws", *Wood Magazine* (Dec. 1985) pp. 54–59, 74.
Pittman, "Scroll Saw or Jig Saw", *Woodworkers Buyer's Guide to Power Tools*, pp. 88–90 (undated).

*Primary Examiner*—Rinaldi I. Rada
*Assistant Examiner*—Clark F. Dexter
*Attorney, Agent, or Firm*—Kirkpatrick & Lockhart

[57] ABSTRACT

A quick release saw blade chuck for connecting a free end of a saw blade to a reciprocating arm of a saw includes a blade holder including a first surface. The free end of the saw blade is interposed between the first surface and the inner surface of a clamping member. The clamping member is coupled to the blade holder by an attachment mechanism which defines a blade-accepting space and a second space between the first and inner surfaces. A mechanism is also provided for varying the size of second space and thereby pivoting the clamping member about the attachment mechanism to vary the size of the blade-accepting space and clamp a blade inserted therein.

29 Claims, 4 Drawing Sheets

QUICK RELEASE SAW BLADE CHUCK AND SAW INCLUDING THE SAME

BACKGROUND OF THE INVENTION

Field of the Invention

The invention generally relates to saw blade chucks used for attaching saw blades to saws. More particularly, the invention relates to a quick release saw blade chuck which may be used with a saw having a blade connected between the free ends of a C-shaped or U-shaped member, such as, for example, a scroll saw or jigsaw. In addition, the invention relates to a scroll saw incorporating the quick release saw blade chuck.

Description of the Invention Background

In any saw using a saw blade having terminal ends, a device must be included for attachment of at least one end of the saw blade. Scroll saws and jigsaws, for example, typically include a two-armed, C-shaped or U-shaped member or yoke which reciprocates around a pivot point at the yoke's rear or center. A saw blade is connected between the free ends of the arms and cuts the workpiece through the yoke's reciprocating motion. In use, it is often necessary to detach one or both ends of the saw blade: worn or broken blades require replacement; one blade type may be replaced with another type for a specific application; or one end of the blade may be detached from the machine to pass the blade through a hole in the workpiece. As such, the design of the device which retains the saw blade becomes important.

In a scroll saw, the end of a saw blade is typically attached to the free end of the yoke by a saw blade chuck which exerts clamping force on the blade by tightening either a screw or a nut. FIG. 2 of U.S. Pat. No. 4,681,006, issued to Miller on Jul. 21, 1987, illustrates a device which clamps the end of the blade between the flat surface of a blade holder member, attached to the reciprocating arm, and a square nut threadedly attached to a threaded screw extending through a portion of the blade holder member. U.S. Pat. Nos. 2,099,321 and 1,964,651, issued to Tautz on Nov. 16, 1937, and Jun. 26, 1934, respectively, disclose a scroll saw blade chuck which retains the saw blade end through force exerted by tightening a thumbscrew against a wall of the chuck. FIGS. 9 and 10 of U.S. Pat. No. 1,877,705 issued on Sep. 13, 1932, to Tautz teach a scroll saw blade chuck including a horizontally extending socket head set screw threaded into the chuck body to place clamping pressure on jaws within the chuck.

In addition to requiring significant time to change or detach a blade, the aforementioned existing designs require either the use of tools or the exertion of significant force to securely clamp the blade within the chuck. Changing a blade can become frustrating where, for example, the threads of the chuck's set screw are clogged or otherwise impaired, thus making rotation difficult. Because the blade may need to be detached or replaced frequently, it is desirable to provide a saw blade chuck which may be quickly and easily opened and closed to reduce the time and effort necessary to detach or replace saw blades.

SUMMARY OF THE INVENTION

A scroll saw is disclosed for use with a saw blade having first and second ends. The scroll saw is comprised of a base portion, a table carried on the base portion, and first and second arms carried on the base portion. The first and second arms are capable of reciprocating movement about the table. A motor or the like is provided for imparting reciprocating movement to the arms.

A quick release saw blade chuck for releasably retaining a first end of the saw blade is provided. The saw blade chuck includes a blade holder having first and second ends. The first end includes a mechanism enabling attachment of the blade holder to the first reciprocating arm. The second end of the blade holder has at least a first surface.

The saw blade chuck also includes a clamping member having at least an inner surface. A mechanism is provided for attaching the clamping member to the blade holder so that the first surface of the second end of the blade holder opposes the inner surface of the clamping member. A blade-accepting space is defined between the blade holder and the clamping member on one side of the attachment means. The end of a saw blade may be inserted into the blade-accepting space. A second space is defined on the other side of the attachment means.

The saw blade chuck further includes a mechanism, such as a cam connected to a lever, with the cam disposed in the second space, for causing the clamping member to pivot about the attachment means. The pivoting motion of the clamping member acts to vary the width of the second space and, consequently, acts to vary the width of the blade-accepting space. By reducing the width of the blade-accepting space, a saw blade may be clamped therein. A second blade-retaining mechanism is provided for connecting the other free end of the blade to the second reciprocating arm.

In accordance with the present invention, there is provided an improved design for a quick release saw blade chuck and a scroll saw design including the same. It is contemplated that the quick release saw blade chuck of the present invention may be used with any device in which a saw blade is connected to a reciprocating member. The invention is particularly suited for saws having a saw blade attached between the free ends of a C-shaped or U-shaped member or yoke. Such saws include, for example, scroll saws and jigsaws.

The saw blade chuck of the present invention may be quickly opened and closed, thereby allowing for quick and easy removal of the saw blade end from the chuck. In addition, the saw blade chuck design of the present invention requires exertion of a minimum amount of effort to both open the chuck and to securely clamp the blade end within the chuck. Also, the chuck of the present invention may be easily adjusted to accommodate saw blades of different sizes. Those and other advantages and benefits will become apparent from the Detailed Description of the Preferred Embodiment hereinbelow.

BRIEF DESCRIPTION OF THE DRAWINGS

The preferred embodiment of the invention will now be described, by way of example only, with reference to the accompanying Figures wherein like members bear like reference numerals and wherein:

FIG. 3A is an enlarged exploded view of the quick release saw blade chuck of the present invention;

DETAILED DESCRIPTION OF THE PREFERRED EMBODIMENT

Figure 1:
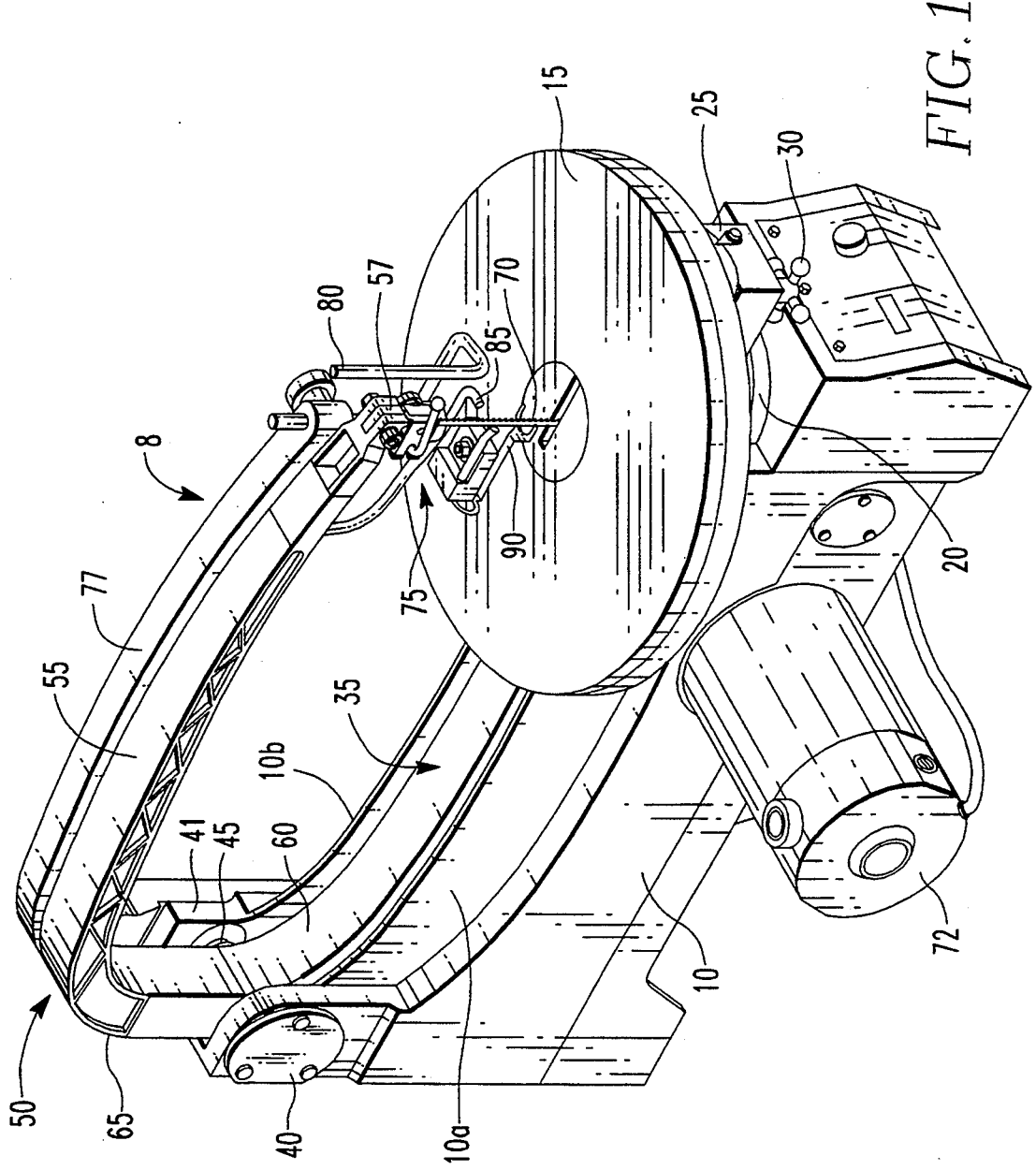
FIG. 1 is a perspective view of a C-arm scroll saw constructed according to the present invention.

Referring now to the drawings, which are for the purpose of illustrating the preferred embodiment of the invention and not for the purpose of limiting the same, FIG. 1 shows a scroll saw 8. The basic structure of the scroll saw is similar to the structure described in Miller, U.S. Pat. No. 4,681,006, issued Jul. 21, 1987, entitled "Blade Tensioning Device for Scroll Saw," the disclosure of which is hereby incorporated by reference. The scroll saw 8 of FIG. 1 includes an elongated base portion 10 at one end of which is mounted a table 15 for supporting a work piece. The orientation of table 15 is adjustable; for example, table 15 may be rotated about a vertical axis on swivel means 20 and, by turning handwheel 30 and releasing trunion assembly 25, may be tilted on an axis approximately along the longitudinal axis of base 10.

Base 10 includes opposed side wall extensions 10a and 10b which define between them an elongated well 35. At an end of base 10 opposite from table 15, side wall extensions 10a and 10b define a pair of opposed, upstanding vertical bearing supports 40 and 41. A horizontally extending pivot shaft 45 is interposed between and rotates within bearing supports 40 and 41.

Figure 2:
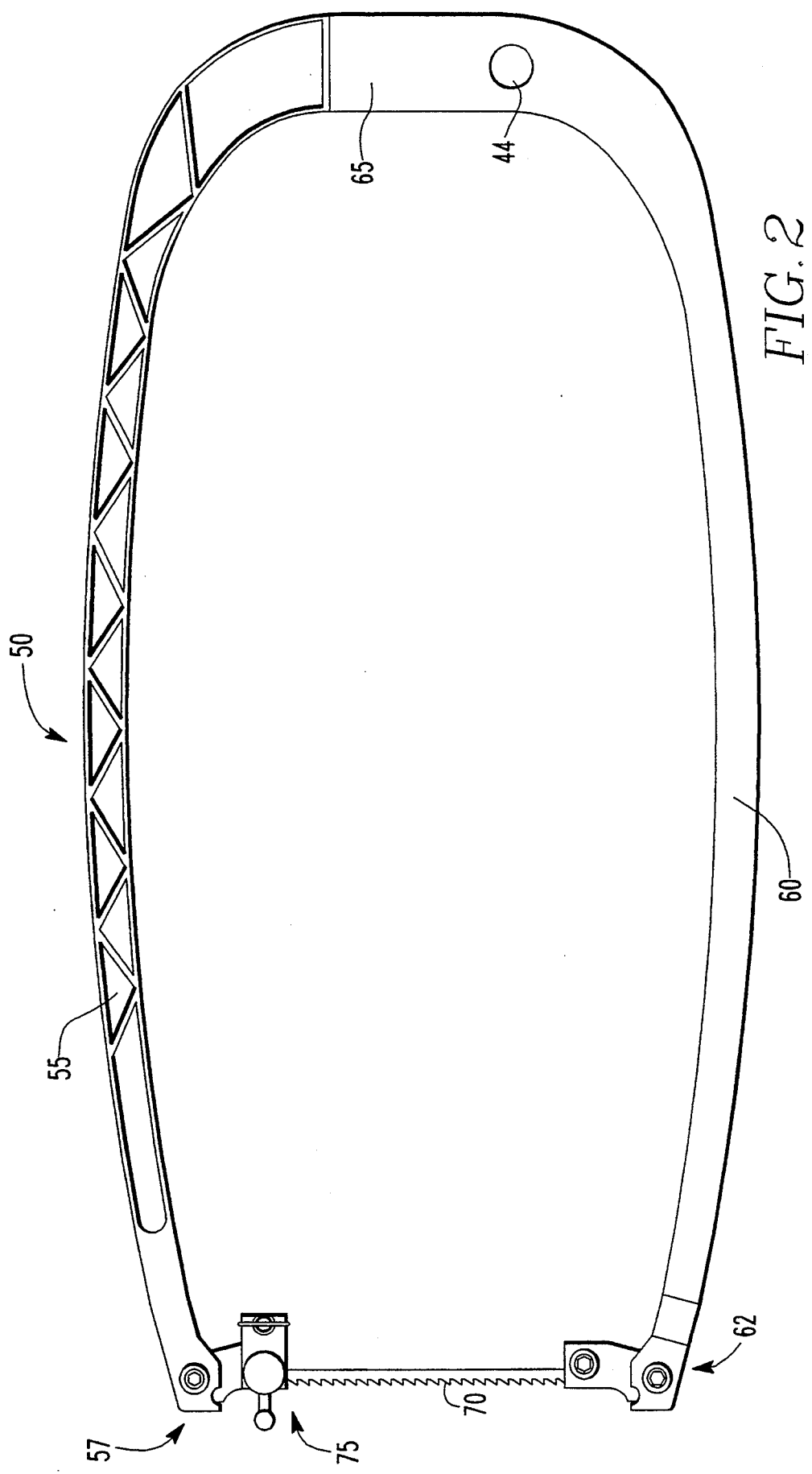
FIG. 2 is an enlarged elevational view of the C-arm member of the scroll saw of FIG. 1.

The scroll saw 8 of FIG. 1 further includes a yoke or C-arm member 50, shown in isolation in FIG. 2, having an upper arm 55 terminating in an upper end 57 and a lower arm 60 terminating in a lower end 62. A curved bight 65 connects the upper arm 55 and the lower arm 60. The curved bight 65 has an aperture 44 extending therethrough adapted to receive shaft 45 when bight 65 is positioned between bearing supports 40 and 41. A saw blade 70 is connected between upper end 57 and lower end 62.

Returning to FIG. 1, motor 72, supported on base 10, reciprocates C-arm member 50 on pivot shaft 45 and thereby moves saw blade 70. A support arm 77, connected to base 10 at bearing supports 40 and 41, extends along upper arm 55, and ends in the vicinity of upper end 57 where it provides support for a saw blade guard 80 and an air nozzle 85.

The lower end 62 of the lower arm 60 includes a conventional mechanism, not shown, for attaching a saw blade to the lower end. The attachment mechanism may include, for example, a blade holder and a locking nut, which is the arrangement described in the Miller patent incorporated herein. It is contemplated that the lower end 62 of lower arm 60 may incorporate the quick release saw blade chuck of the present invention rather than a conventional device for attaching a saw blade.

A quick release saw blade chuck 75 is attached to upper end 57 for releasably retaining one end of the saw blade 70. The upper end 57 and the saw blade chuck 75 are shown in greater detail in FIG. 3A. Upper end 57 is bifurcated, having outer ends 58a and 58b defining a slot 59 therebetween and having a first aperture 61 extending through both members 58a and 58b.

The saw blade chuck includes a blade holder 95 which is a generally flat member having an upper portion 100, having a second aperture 101 therethrough, and a lower portion 105. The lower portion 105 includes substantially flat, opposed surfaces 107 and 109, and has a reduced thickness compared to the upper portion 100, the boundary between the upper portion 100 and the lower portion 105 defining a raised shoulder 121. One end of lower portion 105 includes arms 111a and 111b defining void 113 therebetween. The lower portion 105 also includes a threaded first bore 115 at an end opposite from arms 111a and 111b. The second surface 109 of arms 111a and 111b includes aligned slots 117a and 117b, while the first surface of arms 111a and 111b includes aligned recesses 119a and 119b having substantially half-cylindrical profiles.

The upper end 57 of upper arm 55 is connected to the upper portion 100 of the blade holder 95. When the upper portion 100 of blade holder 95 is positioned in slot 59, a bolt 69 may be passed through the first aperture 61 in outer ends 58a and 58b to connect the upper end 57 of upper arm 55 to the blade holder 95. The blade holder 95 is secured in slot 59 by, for example, threadedly engaging bolt 69 with nut 71. Such an arrangement to secure the blade holder 95 to upper end 57 is provided as an example only and it is contemplated that other attachment arrangements may be used.

Blade holder 95 is shaped such that when it is connected to upper end 57 there is space provided between the rear edge 102 of the upper portion 100 of the blade holder 95 and the rear portion 99 of slot 59 so that blade holder 95 can pivot slightly rearwardly about bolt 69 if the blade 70 is pushed by a workpiece. Allowance for slight rearward movement of the blade holder 95 spreads the tension more evenly along the blade and thereby prevents breakage of the blade. The blade holder 95 additionally includes an elongated lobe 103 at its upper rear corner. When the blade holder 95 is connected to upper end 57, the elongated lobe 103 is adjacent the upper area of the rear portion 99 of slot 59 and prevents the blade holder 95 from pivoting the blade outward if the blade breaks.

The blade chuck further includes a clamping member 125 having a substantially rectangular outline and having inner surface 127 and a substantially flat outer surface 129. The inner surface 127 includes a raised border 131 which surrounds one end of the clamping member 125 and slightly more than one-half of the sides of the clamping member 125 adjacent to that end. The raised border 131 has a slight slope as it tapers from front to back. A second bore 133 extends through the inner and outer surfaces 127 and 129 and is disposed so as to partially intersect border 131 at the end of the clamping member 125. The second bore 133 has a substantially conical profile which tapers inward toward inner surface 127. The outer surface 129 of clamping member 125 includes hollow cylindrical sleeve 135 projecting therefrom and substantially perpendicular thereto. The sleeve 135 is disposed adjacent an end of the clamping member 125 opposite the end having the raised border 131 and is configured to receive coil spring 145. The wall of sleeve 135 includes slit 137. The wall of sleeve 135 includes a second slit, not shown, which opposes slit 137.

The blade chuck additionally includes attachment member 139 having a disc-shaped knob portion 141 and a threaded cylindrical portion 143. The curved outer surface of the knob portion 141 may include indentations to facilitate turning by hand. It is contemplated that the attachment member may be constructed of, for example, a threaded bolt, having a conventionally shaped head portion, and an indented disc-shaped member configured to be placed over the head of the bolt. The disc-shaped member provides a greater surface area facilitating hand-turning of the attachment member.

Again considering the preferred embodiment, the blade chuck includes a collar 147 having a conical shape sized to fit into second bore 133 and to be received onto the cylindrical portion 143 of attachment member 139. The blade chuck also includes a cam member 150 having an eccentrically-shaped camming portion 152 with cylindrical cam axis portions 155a and 155b, defining a cam rotation axis, and a lever portion 157. The cam axis portions 155a and 155b extend from either side of the camming portion and are configured to nest within recesses 119a and 119b of the first surface 107 of blade holder 95. Lever portion 157 is configured such that when cam axis portions 155a and 155b are nested within recesses 119a and 119b, lever portion 157 may be positioned in void 113 as shown in FIG. 3.

In the assembled blade chuck, collar 147 is first received on cylindrical portion 143 of attachment member 139. The cylindrical portion 143 is then passed through second bore 133 and is threadedly received by first bore 115 such that the inner surface 127 of the clamping member 125 opposes the first surface 107 of the blade holder 95. The collar 147 is thus disposed intermediate the second bore 133 and knob portion 141, and is nested within conically-shaped second bore 133. Cam axis portions 155a and 155b are nested in recesses 119a and 119b with camming surface 152 disposed between the clamping member 125 and blade holder 95 and opposing the inner surface 127 of the clamping member 125.

A substantially U-shaped clip 159 is provided having a base portion 161 and two extensions 162a and 162b terminating in inwardly turned projections configured to be received in slots 117a and 117b of arms 111a and 111b. The base portion 161 of clip 159 is received within slit 137 and the slit opposed thereto, and, by virtue of extensions 162a and 162b being disposed within slots 117a and 117b, thereby retains coil spring 145 within sleeve 135. Clip 159 also retains the clamping member 125 in the proper orientation such that the longitudinal axis of the clamping member 125 is aligned with the longitudinal axis of the lower portion 105 of blade holder 95. Clip 159 also retains the camming portion 152 of the cam member 150 between the clamping member 125 and the blade holder 95. The clamping member 125 is further retained in the proper orientation with respect to the blade holder 95 by raised shoulder 121 which abuts raised border 131.

Figure 3:
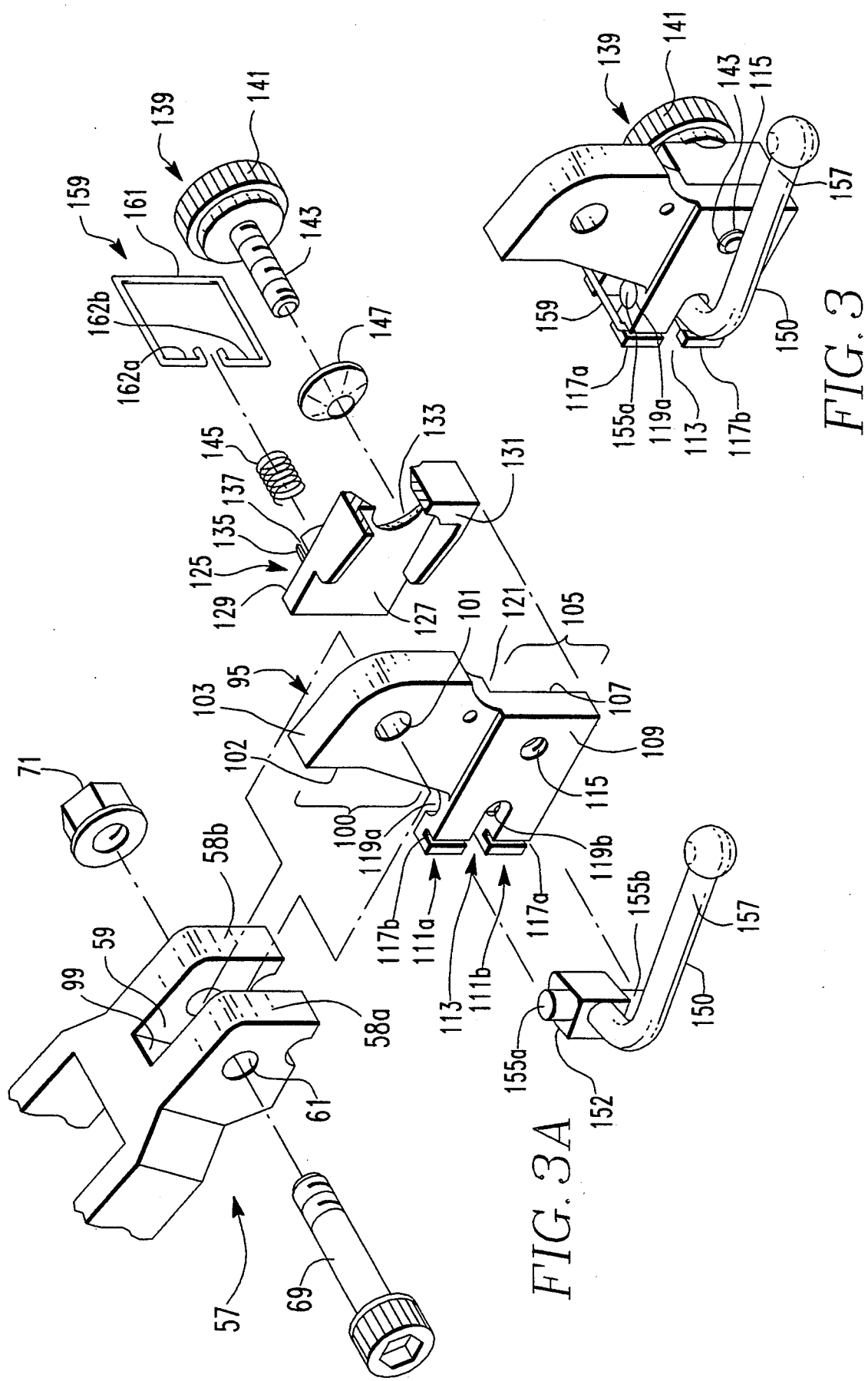
FIG. 3 is an enlarged perspective view of the assembled quick release saw blade chuck of the present invention showing the chuck in the blade-lock position.

The assembled blade chuck is illustrated in FIG. 3. The cylindrical portion 143 of attachment member 139 is shown threadedly retained in first bore 115. Clip 159 is shown disposed in slits 117a and 117b. Cam axis portion 155a is shown nested in recess 119a such that the camming portion 152 of cam member 150 is disposed between inner surface 127 of clamping member 125 and first surface 107 of blade holder 95.

Figure 4:
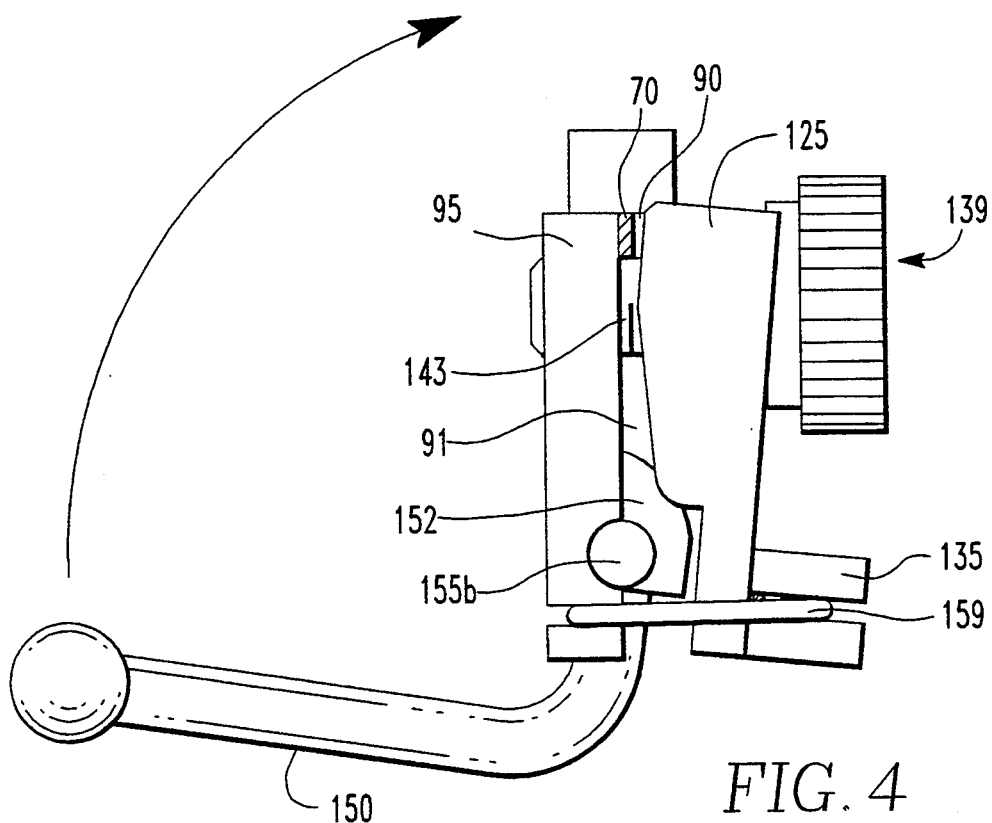
FIG. 4 is an enlarged bottom view of the quick release saw blade chuck of the present invention showing the chuck in the blade-accepting position and showing the saw blade in cross-section.
Figure 5:
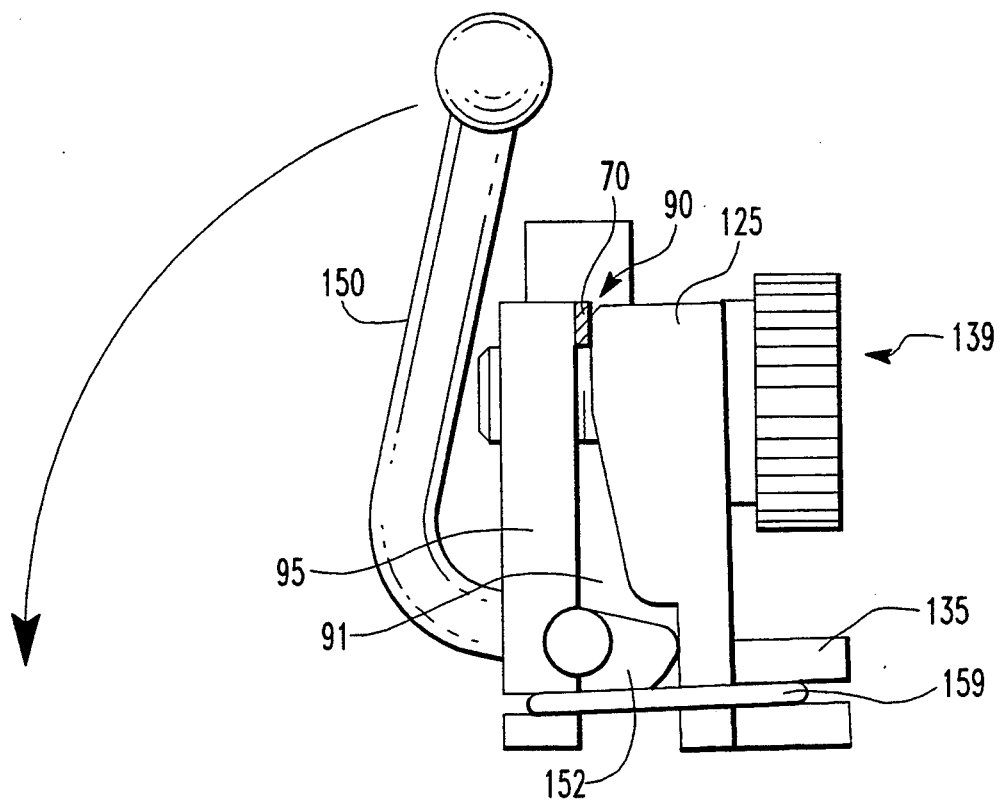
FIG. 5 is an enlarged bottom view of the quick release saw blade chuck of the present invention showing the chuck in the blade-lock position and showing the saw blade in cross-section.

Referring to FIGS. 4 and 5, the functional inter-relationship between the above-described parts may be appreciated. Consideration of FIG. 4 shows that attachment member 139 functions as a pivot point about which clamping member 125 may pivot. It is believed that the fitted arrangement of conically-shaped collar 147 and tapered second bore 133 allows for some sliding motion by attachment member 139 and thereby facilitates this pivoting motion. Threaded portion 143 delimits a blade-accepting space 90 on one side of the threaded portion 143 and a second space 91 on the other side thereof. The blade-accepting space 90 is shown in FIGS. 4 and 5 as including saw blade 70, while the second space is shown as including camming portion 152. It can be seen that blade 70 may be retained in blade-accepting space 90 by causing clamping member 125 to pivot such that the size of second space 91 is increased and the size of the blade-accepting space 90 is decreased to the width of saw blade 70. The invention therefore provides camming portion 152 in second space 91 to vary the size of the second space and thereby vary the size of the blade-accepting space 90.

Consideration of FIGS. 4 and 5 shows that by rotating cam member 150 on the cam rotation axis, the blade chuck may be placed in one of two configurations. Cam member 150 may be rotated to place the blade chuck in the blade-accepting configuration depicted in FIG. 4 wherein camming portion 152 is rotated out of engagement with inner surface 127 of clamping member 125 and the size of the second space 91 is minimized, thereby opening blade-accepting space 90 to accept saw blade 70. After a saw blade has been inserted into the blade-accepting space 90, cam member 150 may be rotated to a blade-lock position, shown in FIG. 5, in which canning portion 152 forces the clamping member 125 away from the blade holder 95 and minimizes the size of the blade-accepting space 90.

To urge open the blade-accepting space 90 when the blade chuck is in a blade-accepting position, coil spring 145 disposed within sleeve 135 acts upon clip 159 thereby pivoting clamping member 125 about attachment member 139 and biases open blade-accepting space 90. It is to be understood that it is not necessary that the blade-accepting space 90 be urged open when the cam member 150 is in the blade-accepting position. It is therefore understood that the accompanying claims encompass a design which does not include a means to urge open blade-accepting space 90.

The above-described elements may be advantageously arranged so as to provide a mechanical advantage such that a certain force applied on the lever portion 157 of the cam member 150 results in a greater clamping force being exerted on the blade 70. Referring to FIG. 4, the distance between the cam rotation axis and the longitudinal axis of the threaded portion 143 of attachment means 139 defines a first moment arm. Likewise, the distance between the longitudinal axis of the threaded portion 143 of attachment means 139 and a point half-way along the inner surface 127 of the clamping member 125 into the blade-accepting space 90 defines a second moment arm. The first and second moment arms pivot about attachment means 139 and, therefore, the moments of both moment arms must be equal. Thus, the product of the force exerted by cam member 152 and the length of the first moment arm must be equal to the product of the force exerted on the blade and the length of the second moment arm. By providing a first moment arm of greater length than the second moment arm, a force applied at the end of the first moment arm generates a greater force at the end of the second moment arm. Therefore, placement of the cam rotation axis at a distance greater than one-half the length of the blade-accepting space provides a mechanical advantage in that a force applied by the cam member 150 will produce a force on the blade 70 which is a multiple thereof. Although any excess in the length of the first moment arm over the second moment arm will provide a mechanical advantage, it is preferred that the ratio of lengths of the first and second moment arms be about 4.5:1, respectively. Although the aforementioned mechanical advantage has been discussed in connection with use of a cam member as the means disposed in the second space, it is understood that a mechanical advantage may be derived by proper orientation of the elements of the blade chuck irrespective of the means used to vary the size of the second space.

The blade chuck of the present invention may also be adjusted to function with a variety of saw blades. Attachment member 139 may be advanced into threaded first bore 115 so as to vary the size of the blade-accepting space 90. In this way, the blade-accepting space 90 may be adjusted to accept blades of different sizes when the blade chuck is in the blade-accepting position. Also, the attachment member 139 may be rotated to adjust the size of the blade accepting space 90 when the blade chuck is in the blade-lock position.

Other means may be substituted for cam member 150 for varying the size of second space 91. For example, a threaded bolt may be substituted for the cam member 150 such that the threaded portion of the bolt threadedly engages a bore disposed through the lower end 105 of blade holder 95 and contacts the inner surface 127 of clamping member 125. It can be seen that advancement of the threaded portion of the bolt through the threaded bore would push on the inner surface of the clamping member and force open the second space, thereby pivoting the clamping member about the attachment member and reducing the size of the blade accepting space. Another embodiment envisions retaining the end of the threaded bolt on the inner surface 127 of the clamping member 125 such that the threaded bolt may freely rotate and displace the clamping member 125 in relation to the blade holder 95. Placing the threaded bolt through the blade holder 95 and retaining the bolt on the clamping member 125 has the advantage of maintaining the clamping member 125 in proper relation to the blade holder 95 while also keeping the blade-accepting space 90 open when the blade chuck is in a blade-accepting configuration. This embodiment would dispense with any need for the clip 159, sleeve 135, coil spring 145 and slits 117a and 117b of the above-described preferred embodiment.

Referring again to the preferred embodiment illustrated in the figures, if the cam member 150 is in the blade lock position illustrated in FIG. 5 and either the saw blade 70 breaks or it is necessary to insert saw blade 70 into a hole drilled into a workpiece, operation of cam member 150 from the position shown in FIG. 5 to the position shown in FIG. 4 releases one end of the saw blade 70. The saw blade 70 may be removed or the end may be inserted into a hole drilled through a workpiece. Thereafter, the free end of the saw blade 70 is reinserted into the saw blade chuck and the cam member 150 is rotated from the blade-accepting position shown in FIG. 4 to the blade-lock position shown in FIG. 5. No tools are necessary and the rotation of set screws and the like is eliminated. Operation of the cam member 150 is easy, quick, and is less likely to be affected by sawdust or the like than are the threads of a set screw. It is thus seen that the quick release saw blade chuck of the present invention provides a substantial advance over the existing devices.

Although the quick release saw blade chuck 75 of the present invention has been described in conjunction with a scroll saw, it is anticipated that the quick release saw blade chuck may be used with other types of saws having reciprocating arms. It is also possible that in a scroll saw of the type described, two quick release chucks may be used, one to retain each free end of the saw blade. It is also anticipated that the quick release saw blade chuck of the present invention may find applications in saws of the type having a single reciprocating member. Thus, it is anticipated that those of ordinary skill in the art will conceive of many modifications and variations of the present invention. Such modifications and variations are intended to be covered by the foregoing specification and the following claims.

What is claimed is:

1. A scroll saw for use with a saw blade having first and second ends, comprising:
   a base portion;
   a table carried on said base portion;
   first and second arms carried on said base portion and mounted for reciprocating motion about said table;
   means for imparting reciprocating movement to said arms; a quick release saw blade chuck for releasably retaining a first end of the saw blade inserted therein, said saw blade chuck comprising:
   a. a blade holder having first and second ends, said first end including means for connecting said blade holder to said first reciprocating arm, said second end including a first surface;
   b. a clamping member having at least an inner surface;
   c. attaching means for attaching said clamping member to said blade holder such that said inner surface of said clamping member opposes said first surface of said blade holder to define a blade-accepting space, having a length and a width, between said inner surface and said first surface on one side of said attaching means and a second space between said inner surface and said first Surface on an opposite side of said attaching means;
   d. means disposed in said second space for causing said clamping member to pivot about said attaching means thereby varying a width of said second space and said width of said blade-accepting space; and
   means for mounting a second end of said saw blade to said second reciprocating arm.

2. The scroll saw of claim 1 wherein a distance between said means disposed in said second space and said attaching means defines a first moment arm and one-half the length of said blade-accepting space defines a second moment arm, and wherein said first moment arm is longer than said second moment arm.

3. The scroll saw of claim 2 wherein said first moment arm is about 4½ times longer than said second moment arm.

4. The scroll saw of claim 1 wherein said means disposed in said second space is a cam means including a camming portion and a cam rotation axis, said camming portion rotatably mounted about said cam rotation axis between said blade holder and said clamping member, said camming portion rotatable about said cam rotation axis between a blade-lock position, wherein said camming portion pivots said clamping member so as to increase the size of said second space and decrease the size of said blade-accepting space, and a blade-receiving position, wherein said camming portion pivots said clamping member so as to decrease the size of said second space and increase the size of said blade-accepting space.

5. The scroll saw of claim 4 wherein a distance between said cam rotation axis and said attaching means is greater than one-half the length of said blade-accepting space.

6. The scroll saw of claim 5 wherein a ratio of a distance between said cam rotation axis and said attaching means and one-half the length of said blade-accepting space is about 4½:1.

7. The scroll saw of claim 4 wherein said attaching means adjustable so as to vary the distance between said first surface and said inner surface, thereby adjusting the size of said blade-accepting space.

8. The scroll saw of claim 4 wherein said second end of said blade holder includes a first bore extending therethrough and said clamping member includes a second bore extending therethrough, said attaching means extending through said first and second bores.

9. The scroll saw of claim 8 wherein said second bore has a substantially conical profile tapering inward toward said inner surface and wherein the walls of said first bore are threaded, said attaching means including a collar, said collar having a conical profile sized to fit within said second bore, said attaching means further including a threaded cylindrical portion extending through said collar to engage the threaded walls of said first bore.

10. The scroll saw of claim 4, further including retaining means acting on said blade holder and said clamping member to maintain said inner surface opposed to said first surface.

11. The scroll saw of claim 10 wherein said clamping member includes first receiving means and said blade holder includes second receiving means, said retaining means including a U-shaped clip having a base portion and two outwardly extending arms, said base portion received by said first receiving means, said arms received by said second receiving means.

12. The scroll saw of claim 11, further including biasing means acting on said retaining means and said clamping member so as to increase the size of said blade-accepting space.

13. The scroll saw of claim 12 wherein said first receiving means includes a hollow sleeve projecting substantially perpendicularly from said clamping member, said sleeve having two opposed slots, and wherein said biasing means is disposed within said sleeve and said base portion of said clip is disposed within said opposed slots such that said base portion retains said biasing means within said sleeve.

14. The scroll saw of claim 13 wherein said biasing means is a coil spring.

15. A scroll saw for use with a saw blade having first and second ends, comprising:
a base portion;
a table carried on said base portion;
first and second arms carried on said base portion and mounted for reciprocating motion about said table;
means for imparting reciprocating movement to said arms; a quick release saw blade chuck for releasably retaining a first end of the saw blade inserted therein, said saw blade chuck comprising:

a. a blade holder having first and second ends, said first end including means for connecting said blade holder to a said first reciprocating arm, said second end including a first surface and a receiving means, said second end further including a first bore extending therethrough, the walls of said first bore being threaded;

b. a clamping member having at least an inner and an outer surface and a second bore extending between said inner and outer surfaces, said second bore having a substantially conical profile tapering inward toward said inner surface, said clamping member further including a hollow sleeve extending from said outer surface, said sleeve including two opposed slots;

c. attaching means for attaching said clamping member to said blade holder such that said inner surface of said clamping member opposes said first surface of said blade holder to define a blade-accepting space, having a length and a width, between said inner surface and said first surface on one side of said attaching means, and a second space between said inner surface and said first surface on an opposite side of said attaching means, said attaching extending through said second bore and including a collar having a conical profile sized to fit within said second bore, said attaching means being threadedly received by said first bore and being adjustable so as to vary the distance between said first surface and said inner surface, thereby adjusting the size of said blade-accepting space;

d. a cam means disposed in said second space, said cam means including a camming portion and a cam rotation axis, said camming portion rotatably mounted about said cam rotation axis between said blade holder and said camming member, said camming portion rotatable about said cam rotation axis between a blade-lock position wherein said camming portion pivots said clamping member about said attaching means so as to increase the size of said second space and decrease the size of said blade-accepting space, and a blade-receiving position wherein said camming portion pivots said clamping member about said attaching means so as to decrease the size of said second space and increase the size of said blade-accepting space;

e. retaining means acting on said blade holder and said clamping member to maintain said inner surface opposed to said first surface, said retaining means comprising a U-shaped clip having a base portion and two outwardly extending arms;

f. biasing means acting on said retaining means and said clamping member so as to increase the size of said blade accepting space, said biasing means comprising a coil spring, said coil spring disposed within said sleeve and retained therein by said base portion of said clip disposed within said opposed slots of said sleeve, said outwardly extending arms of said clip retained in said receiving means of said blade holder; and means for mounting a second end of said saw blade to said second reciprocating arm.

16. A quick release saw blade chuck, comprising:

a blade holder having a first end including means for connecting said blade holder to a saw frame and a second end including at least a first surface;

b. a clamping member having at least an inner surface;

c. attaching means for attaching said clamping member to said blade holder such that said inner surface of said clamping member opposes said first surface of said blade holder to define a means for holding a blade, said means for holding a blade including a blade-accepting space for receiving an end of a saw blade, said blade accepting space having a length and a width and being disposed between said inner surface and said first surface on one side of said attaching means, said inner surface of said clamping member opposing said first space of said blade holder to also define a second space, said second space disposed between said inner surface and said first surface on an opposite side of said attaching means; and d. means disposed in said second space for altering the size of said second space so as to pivot said clamping member about said attaching means, thereby varying the size of said blade-accepting space.

17. The quick release saw blade chuck of claim 16 wherein a distance between said means disposed in said second space and said attaching means defines a first moment arm and one-half the length of said blade-accepting space defines a second moment arm, and wherein said first moment arm is longer than said second moment arm.

18. The scroll saw of claim 17 wherein said first moment arm is about 4½ times longer than said second moment arm.

19. The quick release saw blade chuck of claim 16 wherein said means disposed in said second space is a cam means including an eccentrically-shaped cam surface and a cam rotation axis, said cam means rotatable on said cam rotation axis to cause the size of said second space to vary and thereby pivot said clamping member about said attaching means so as to vary the size of said blade-accepting space.

20. The quick release saw blade chuck of claim 19 wherein a distance between said cam rotation axis and said attaching means defines a first moment arm and one-half the length of said blade accepting space defines a second moment arm, and wherein said first moment arm is longer than said second moment arm.

21. The quick release saw blade chuck of claim 20 wherein said first moment arm is about 4½ times longer than said second moment arm.

22. The quick release saw blade chuck of claim 19 wherein said attaching means is adjustable so as to vary a distance between said first surface and said inner surface, thereby adjusting the size of said blade-accepting space.

23. The quick release saw blade chuck of claim 19 wherein said second end of said blade holder includes a first bore extending therethrough and said clamping member includes a second bore extending therethrough, said attaching means extending through said first and second bores.

24. The quick release saw blade chuck of claim 23 wherein said second bore is substantially cone-shaped and tapers inward toward said inner surface, and wherein the walls of said first bore are threaded, said attaching means including a cone-shaped collar sized to fit within said second bore, said attaching means further including a threaded portion extending through said collar to engage the threads of said first bore.

25. The quick release saw blade chuck of claim 19, further including means to retain said blade holder and said clamping member in positions such that said inner surface opposes said first surface.

26. The quick release saw blade chuck of claim 25 wherein said clamping member includes first receiving means and said blade holder includes second receiving means, said retaining means comprising a base portion and two extending portions, said base portion received by said first receiving means, said extending portions received by said second receiving means.

27. The quick release saw blade chuck of claim 26, further including means for biasing said clamping member toward said blade holder in said second space to increase the size of said blade-accepting space.

28. The quick release saw blade chuck of claim 27 wherein said first receiving means comprises a hollow sleeve projecting substantially perpendicularly from said clamping member, said sleeve having two opposed slots, and wherein said biasing means is disposed within said sleeve and said base portion of said retaining means is disposed within said opposed slots such that said base portion retains said biasing means within said sleeve.

29. The quick release saw blade chuck of claim 28 wherein sa biasing means is a coil spring.

* * * * *

UNITED STATES PATENT AND TRADEMARK OFFICE
CERTIFICATE OF CORRECTION

PATENT NO. : 5,363,733
DATED : November 15, 1994
INVENTOR(S) : Charles J. Baird, et al It is certified that error appears in the above-indentified patent and that said Letters Patent is hereby corrected as shown below:

Col. 9, line 19, after "means", insert --is--.

Col. 10, line 28, after "attaching", insert --means--.

Col. 10, line 40, delete "camming" and substitute therefor --clamping--.

Col. 12, line 49, delete "sa" and substitute therefor --said--.

Signed and Sealed this

Sixth Day of June, 1995

Attest:

BRUCE LEHMAN

*Attesting Officer*    *Commissioner of Patents and Trademarks*